July 15, 1969 — L. L. HAYES — 3,455,351
SELF-CLEANING WOOD LATHE CHUCK
Filed June 30, 1967
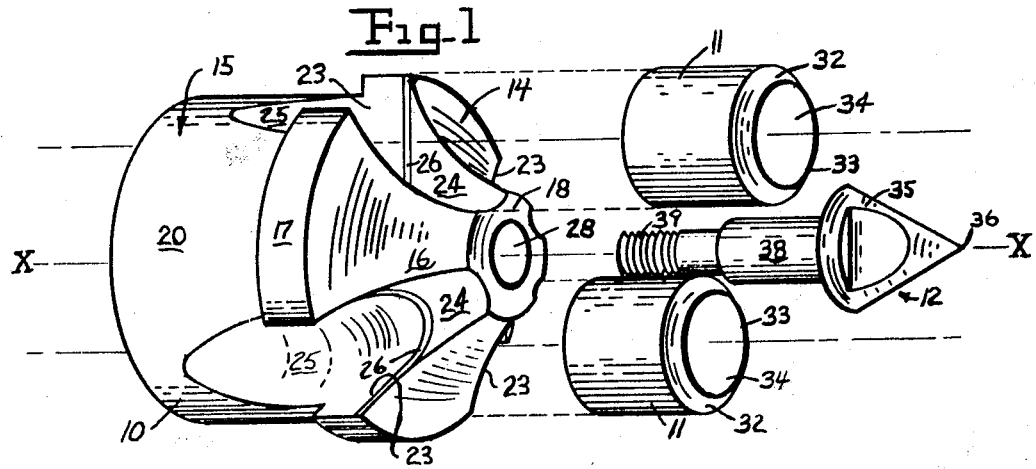
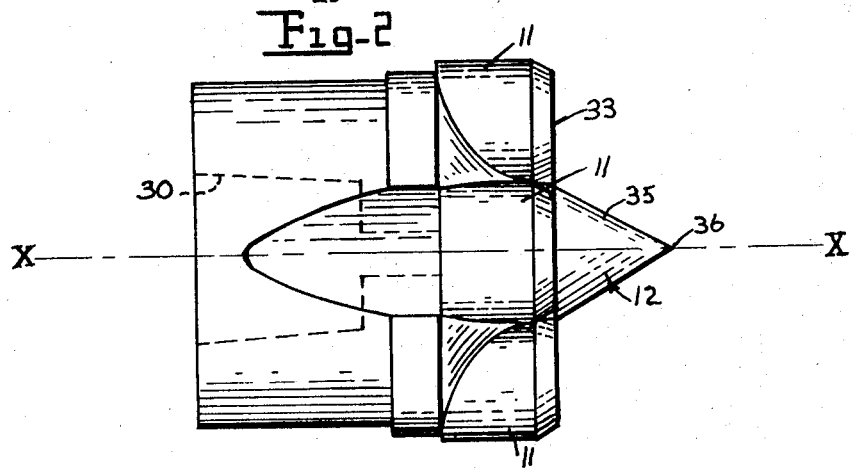
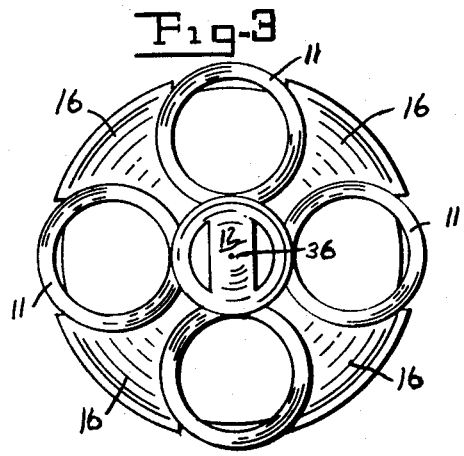
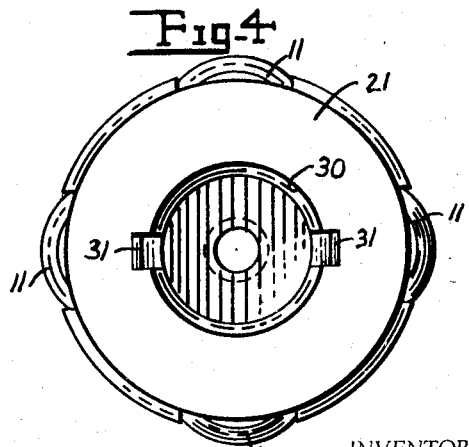
INVENTOR.
LEONARD L. HAYES
BY
Wells & St. John
ATTYS.

United States Patent Office 3,455,351
Patented July 15, 1969

3,455,351
SELF-CLEANING WOOD LATHE CHUCK
Leonard L. Hayes, Lewiston, Idaho, assignor to Potlatch Forest, Inc., Lewiston, Idaho, a corporation of Delaware
Filed June 30, 1967, Ser. No. 650,357
Int. Cl. B27c 7/04; B23b 33/00
U.S. Cl. 142—53                                         4 Claims

ABSTRACT OF THE DISCLOSURE

The disclosure describes a self-cleaning chuck that has a cylindrical chuck body, four tubular members, and a center tool. Apertures are formed in the body angularly and evenly spaced about the center axis for receiving the tubular members and for facilitating the self discharge of the work piece chips. The members have sharp front edges for engaging the work piece spaced from the center axis. The center tool has a conical front section for penetrating the work piece along the center axis.

Background of the invention

This invention relates to work holders and more particularly to self-cleaning lathe chucks for supporting and rotating a wood work piece about a center axis.

In the preliminary stage of the manufacture of plywood, logs are mounted on lathes. The logs are supported at the ends by chucks that are fixed to the lathe spindles. The logs are rotated on the lathe and peeled to form thin wood veneer sheets that are subsequently used in forming plywood as it is presently known. To effectively support and grasp a log by its ends, each chuck must take a bite of one end of the log, i.e. penetrate into the end of the log.

Generally after a few logs have been peeled, the lathe must be stopped and wood bits, pieces, and chips removed from the chuck so that the chucks can effectively grasp the subsequent logs. It is very costly to have the log slip from the chuck or to move even slightly from its original position in relationship to the lathe while the log is being rotated.

Stopping of the lathe means loss of production and added expense in the manufacturing costs of plywood.

Objects and summary of the invention

One of the principal objects of this invention is to provide a chuck that is self-cleaning and does not require cleaning by stopping the lathe and manually removing the wood chips and pieces from the chuck.

An additional object of this invention is to provide a self-cleaning chuck that is capable of effectively and efficiently holding logs of considerable diameter.

A further object of this invention is to provide a self-cleaning wood chuck that is economical to manufacture, simple to assembly, and easy to attach to a lathe spindle.

Other objects of this invention will become apparent to the reader from the drawings and following description of a preferred embodiment of the invention.

This invention concerns a self-cleaning chuck having a cylindrical body with a plurality of angularly spaced apertures formed therein that extend from the front end of the body rearward terminating at one of the outer surfaces of the body. Open hollow members having sharp end edges are mounted in the apertures and extend forward for engaging the work piece spaced from the center axis and for passing the work piece chips through the hollow member and from the chuck. More particularly a center tool is mounted within the chuck body and extends forward therefrom for engaging the work piece along the center axis. The forward end of the chuck body has an inclined surface for facilitating the self-removal of the work piece chips from the centering tool.

Brief description of the drawings

A preferred embodiment of this invention is illustrated in the accompanying drawings, in which:

FIG. 1 is a perspective assembly view of a self-cleaning chuck showing the principal elements and features of this invention;

FIG. 2 is a side elevation view of the self-cleaning chuck;

FIG. 3 is a front view of the self-cleaning chuck; and

FIG. 4 is a rear view of the chuck.

Description of the preferred embodiment

The accompanying drawings illustrate a self-cleaning chuck for mounting on a lathe so that it is unnecessary to stop the lathe to clean the chips from the chuck. The chuck comprises a cylindrical chuck body 10 and a plurality of tubular members 11 that are mounted to the chuck body for engaging the work piece spaced from the center axis X. A center tool 12 is mounted to the chuck body 10 and extends forward therefrom for engaging the work piece at the center axis X.

The cylindrical chuck body 10 has a front section 14 and a rear section 15. The front section 14 has a forward sloping concave surface 16 formed thereon that extends from the outer circumferential surface 17 to the front end surface 18 to form a curved path for facilitating the self discharge of work piece chips from the chuck.

The rear section 15 of the cylindrical chuck body 10 has a reduced diameter with a cylindrical outer surface 20 and a rear end surface 21 as shown in FIG. 4.

Four apertures 23 are formed in the cylindrical chuck body 10 angularly and evenly spaced about the body 10. Each of the apertures 23 has a cylindrical front portion 24 formed in the front section 14 which is parallel to and radially spaced from the center axis X. Each of the apertures 23 has a sloping portion 25 that extends outwardly and rearwardly from the cylindrical portion 24 to the circumferential outer surface 20. The aperture portion 25 forms a shoulder 26 with the cylindrical portion 24 (FIG. 1).

A center bore 28 is formed in the cylindrical chuck body 10 along the axis X. A tapered counter bore 30 is formed in the rear section 15 of the body 10 for receiving the lathe spindle. Tapered key slots 31 are formed in the walls of the counter bore 30 for receiving keys there mounted in the spindle shaft to facilitate rotation of the chuck and the work piece (FIG. 4).

The tubular members 11 are open at their ends and are mounted in the respective cylindrical portions 24 with the rear ends abutting the shoulders 26. The tubular members 11 are hollow having a cylindrical inner surface 34. The height of the shoulders 26 at the base of the apertures 23 corresponds to the thickness of the tubular member to provide a continuous surface to facilitate the discharge of the wood particles and chips through the tubular members 11 and out through the sloping aperture portions 25. The forward ends of the members 11 have bevelled front surfaces 32 forming sharp annular edges 33 for engaging the work piece radially spaced from the center axis X.

The center tool 12 is mounted within the center bore 28. The center tool 12 has an expanded conical front section 35 that abuts against the front end 18 of the chuck body 10. The conical front section 35 comes to a point 36 along the center axis for engaging and penetrating the work piece at the center of rotation. Flats 37 are formed in the conical section 35 for facilitating the mounting of the chuck onto the lathe spindle. Immediately behind the cone section 35 is a shank section 38 with a reduced cross section for extending rearward through the front section 14 of the body 10. Exterior threads 39 are formed on the rear end of the center tool 12 for meshing the interior threads on the lathe spindle to facilitate the securing of the chuck to the lathe spindle.

In operation the work piece is mounted between two opposing and spaced apart lathe chucks mounted on lathe spindles. The chucks are then moved toward each other to engage and support the work piece. The conical front section 35 of the center tool 12 first penetrates the log along the center axis X. As the chucks continue to move inwardly the conical sections 35 move further into the log ends. The sharp annular edges 33 of the tubular members 11 engage and penetrate the log ends radially spaced from the center axis so that the log will not rotate with respect to the chuck but is held secure thereto. Any chips or pieces that are broken off from the log are discharged from the chuck either by sliding over the inclined concave surface 16, or through the tubular members 11 and out the rear section 15. Occasionally wood chips will become lodged in the tubular members. However, subsequent chips will push against the lodged chips and push them from the chuck. Thus it can be said that the described chuck is self-cleaning requiring no manual cleaning operations.

As viewed from the front all of the front projected surfaces slope outwardly and rearwardly to facilitate the discharge of the chips, etc. As may be particularly seen in FIG. 2 and FIG. 3 the conical front section 35 of the center tool overlaps sectors of the tubular members 11 so that wood chips cannot be lodged therebetween.

What is claimed is:
1. A self-cleaning chuck mountable on a lathe spindle for engaging and rotating a workpiece about a center axis, said chuck comprising:
  (a) a cylindrical chuck body having:
    (1) an inclined front surface extending forward and inward from the circumference;
    (2) a plurality of angularly spaced apertures formed therethrough radially spaced from the center axis, in which each of the apertures includes:
    (3) a cylindrical forward portion aligned parallel with the center axis and communicating with the inclined front surface;
    (4) a shoulder formed at the rear of the forward portion; and
    (5) a rear portion communicating with the forward portion and extending outward and rearward to facilitate discharge of workpiece material from the chuck; and
  (b) a plurality of open tubular members removably mounted within the front aperture portions with the rear ends of the tubular members against the shoulders and the forward ends extending forward of the inclined front surface for engaging the workpiece spaced from the center axis and for passing workpiece material therethrough.

2. A self-cleaning chuck mountable on a lathe spindle for engaging and rotating a workpiece about a center axis, said chuck comprising:
  (a) a cylindrical chuck body having a plurality of apertures formed therein radially spaced from the center axis and a concave face surface that slopes forward to facilitate discharge of the workpiece material from the chuck; and
  (b) a plurality of angularly spaced hollow members open at both ends mounted in the apertures for engaging the workpiece spaced from the center axis and for passing workpiece material through the hollow members and from the chucks.

3. A self-cleaning chuck as defined in claim 2 wherein the forward ends of the hollow members are bevelled to form sharp edges for engaging the workpiece spaced from the center axis.

4. A self-cleaning chuck as defined by any one of the claims 1 and 2 wherein the cylindrical chuck body has a center bore formed therein and wherein further a center tool is mounted within the center bore with one end of the tool having a point thereon for engaging the workpiece along the center axis.

References Cited

UNITED STATES PATENTS

| 2,879,816 | 3/1959 | Cook et al. | 82—40 XR |
| 3,044,511 | 7/1962 | Wieckman et al. | 144—209 |

FOREIGN PATENTS

| 1,563 | 4/1926 | Australia. |

LEONIDAS VLACHOS, Primary Examiner

U.S. Cl. X.R.
82—40; 144—209